3,830,746
METHOD FOR PREPARING TECHNETIUM-99m GENERATORS LOADED WITH FISSION PRODUCT MOLYBDENUM-99

James L. Brown, Jefferson County, Mo., and Orval A. Harris, Collinsville, Ill., assignors to Mallinckrodt Chemical Works, St. Louis, Mo.
No Drawing. Filed July 27, 1972, Ser. No. 275,510
Int. Cl. C01f 3/00
U.S. Cl. 252—301.1 R                    7 Claims

ABSTRACT OF THE DISCLOSURE

A method for preparing a technetium-99m generator whose sodium pertechnetate eluates have a very low molybdenum and aluminum content. Low molybdenum content of the eluate is realized by initially heat-activating the alumina used for the generator column. The heat-activated alumina column is loaded by treating it with a solution of pH 3–4 containing molybdate ions whose molybdenum content consists essentially of molybdenum-99.

BACKGROUND OF THE INVENTION

This invention relates to the preparation of radioisotope generators and more particularly to improved methods for the manufacture of generators loaded with fission product molybdenum-99.

Because of its organ specificity and the minimal physiological risks associated with its short half-life, the radionuclide technetium-99m is of increasing importance in the field of nuclear medicine. The most common diagnostic form of technetium-99m is as a solution of sodium pertechnetate in sterile, pyrogen-free physiological saline.

Because of its short half-life (6 hours), the sodium pertechnetate solution is usually prepared as needed by elution of a technetium generator which is essentially a chromatographic column on which is adsorbed molybdenum-99 in the form of molybdate ions. The substrate commonly used for the column is alumina. According to conventional practice, such generators are activated for the adsorption of molybdenum by first contacting the alumina with dilute (pH 1.1) hydrochloric or nitric acid. A sodium molybdate solution containing the molybdenum-99 and having a pH of approximately 3 to 5 is then passed through the column which adsorbs the molybdate ions from the solution. The loaded column is then washed sequentially with dilute acid and physiological saline to "fix" molybdenum to the column and remove unwanted ions. An improved fixing wash involving the use of an acetate solution is more fully described in our copending application Ser. No. 177,269, filed Sept. 2, 1971.

Conventionally, technetium generators have been charged with molybdenum-99 which has been obtained by neutron bombardment of molybdenum-98. A minor proportion of the molydenum-98 is converted to its radioisotope molybdenum-99 by neutron capture. Radioactive molybdenum so prepared is referred to hereinafter as "neutron product."

Molybdenum-99 can also be obtained as a fission product from neutron bombardment of uranium-235. This "fission product" is available in the form of sodium molybdate solutions having a much higher specific radioactivity than the maximum attainable from a neutron product. By using this highly active fission product for loading, technetium generators can be prepared which yield sodium pertechnetate eluates of exceptionally high radioactivity and which are consequently very desirable for certain medical applications. Unfortunately, however, when such a generator is prepared in the conventional fashion, the eluates obtained therefrom have been found to contain objectionably high levels of molybdenum-99 and aluminum ions. Because of the high specific activity of fission product molybdenum-99 and the relatively long half-life thereof, the molybdenum content of the eluate is a matter of special concern. High aluminum ion content also presents difficulties, and the extent of aluminum breakthrough may be aggravated by radiolytic attack of the alumina resulting from the high specific radioactivity levels in the generator.

Attempts have been made in the art to minimize the molybdenum-99 breakthrough on elution of fission product generators by utilizing a relatively high pH (i.e., 4–9) sodium molybdate solution in loading the column. British Pat. 1,265,769, for example, reports success with this approach in reducing the molybdenum observed in the sodium pertechnetate eluate. For proper column loading, however, the pH of the molybdate solution should be between 3 and 4, optimally about 3.5. This pH level is necessary for attaining maximal loading of molybdenum-99 on the column. According to the aforementioned British patent, some type of pretreatment and post-treatment of the substrate alumina is necessary for the successful loading of such substrate at a pH level below 4. No suggestion, however, is made of any effective pretreatment or posttreatment method and the teaching of the British patent focuses on the pH range of 4–9 where it is said that treatment is unnecessary.

An unfulfilled need has existed in the art, therefore, for a method of producing a generator of the maximal activity attainable at a loading pH in the desired range of 3 to 4, while avoiding the molybdenum breakthrough problems which have previously plagued the art.

SUMMARY OF THE INVENTION

It is an object of the present invention, therefore, to provide an improved method for producing technetium-99m generators loaded with fission product molybdenum-99. It is a further object of the invention to provide such a method which affords maximal loading of molybdenum-99 on the alumina adsorbent constituting the generator column. It is a particular object of the invention to provide such a method which insures that eluates obtained from the generator so produced will have a minimal molybdenum-99 content and that the generator will give high yields of sodium pertechnetate. It is a further object of the invention to provide such a method by which the aluminum ion content of the eluates is also minimized. And it is an additional object of the invention to provide such a method which prevents radiolytic hydrolysis of the alumina substrate due to excessive retention of unadsorbed molybdenum ions in the column. Other objects and features will be in part apparent and in part pointed out hereinafter.

In its fundamental aspect, therefore, the present invention is directed to a method for preparing a technetium-99m generator. In accordance with the method, a column is prepared containing heat-activated chromatographic alumina. The column is treated with a solution having a pH of between 3 and 4 containing molybdenum ions whose molybdate content consists essentially of molybdenum-99. The treated column is washed with physiological saline solution to remove unwanted ions.

DESCRIPTION OF THE PREFERRED EMBODIMENTS

In construction, the generators prepared according to the present invention are essentially similar to those conventionally used heretofore except that the use of fission product molybdenum-99 allows the dimensions of the column to be much smaller than the dimensions a neutron product generator of equivalent capacity. When loaded with a molybdate solution of pH 3 to 4, for example, only 1 to 2 g. of alumina are required for a 100 millicurie generator charged with fission product molybdenum-99, whereas 20 g. or more is required for a generator of the same capacity charged with neutron product molybdenum-99. The same quality chromatographic alumina may be used for the fission product generator as for the neutron product generator.

Preparation of fission product generators according to the present invention is in many respects similar to the preparation of conventional neutron product generators. The key difference between the method of the invention and the methods heretofore used for preparation of neutron product generators is in the activation of the alumina used for the generator column. If conventional acid activation techniques are used in the preparation of a fission product molybdenum-99/technetium-99m generator, appreciable and objectionable amounts of molybdenum-99 are eluted along with the sodium pertechnetate when the generator is put to use. If, on the other hand, the alumina is used as is without prior activation, it is incapable of holding molybdenum-99 at the high levels of activity which are desired.

It has now been discovered, however, that the alumina can be very effectively activated for adsorption of molybdate by heat activation and that this method of activation substantially avoids subsequent breakthrough of molybdenum-99 in the elution of the column. Such breakthrough is avoided even with the exceptionally high molybdenum-99 loadings which are realized when the column is loaded with a molybdate solution having a pH of 3 to 4.

According to the method of the invention, the alumina is heated for a relatively short time at a temperature of between about 100° C. and 150° C., for example at 120° C. for 20 minutes. After such treatment, the alumina is capable of adsorbing very high levels of fission product molybdenum-99 while the molybdenum-99 content of the eluate is kept well below objectionable levels. In fact, the molybdenum content of such eluates is below the threshold of detection utilizing the methods which have been specified for determination of whether an eluate meets current safety standards.

The extent of activation realized by heating the alumina is a function of the time for which the alumina is exposed to a particular temperature. Heating by autoclaving the column at a temperature of 121° C. for 20 minutes is sufficient to provide satisfactory activation. If lower temperatures are used, the time should be extended somewhat for maximum activation. Temperatures above 150° C. should be avoided, since dehydration of the alumina may occur at a temperature around 160° C. or above, with detrimental effects on the chromatographic properties of the alumina.

In the manufacture of a generator, a glass column containing heat-activated alumina is prepared with a porous support at the lower end thereof. A shallow layer of silicic acid is preferably provided on top of the alumina and any empty space in the column is conveniently filled with glass wool. Conveniently the alumina is charged to the column prior to activation and the charged column placed in an autoclave or subjected to other suitable heating means where activation takes place. Loading is effected by passing an acid (pH 3.5) solution of sodium molybdate containing fission product molybdenum-99 through the activated alumina column. Because of the high specific activity of the fission product, a relatively small volume of solution is used compared to the volume required for the preparation of a neutron product generator of equivalent capacity.

After the column is loaded with molybdenum-99, it is washed with physiological saline to remove residual acid and other unwanted ions. Prior to the saline wash, the column may advantageously be washed with an acetate solution having a pH of between 2.8 and 6.0, preferably 4.0, as disclosed in our aforementioned copending application. The acetate wash serves to reduce the aluminum ion content to exceptionally low levels in the pertechnetate eluates subsequently obtained from the column.

It has also been found important to aspirate residual solution from the column following the saline wash by passing air through the column. If excess unadsorbed molybdate ions are not removed from the column by aspiration, radiolytically induced hydrolytic attack of the alumina may occur as a result of the very high levels of radiation attainable in the generators prepared in accordance with the method of the invention.

The following example illustrates the invention.

EXAMPLES

Six 100 millicurie technetium generators were prepared in the following manner:

Fines were removed from a quantity of chromatographic alumina (Woelm) by placing the alumina on a No. 200 U.S. sieve size stainless steel screen and backwashing the retained fraction with water until the supernatant liquid was clear.

A slurry containing approximately 1.25 g. of the washed alumina was transferred into each of six glass generator columns (10 mm. O.D. x 65 mm.) having a fritted glass disc fused to one end thereof and neckpieces adapted to receive standard rubber stoppers attached to both ends. A shallow layer of silicic acid was added above the alumina and the remaining empty space in each column was filled with glass wool which had previously been boiled in 10% by volume hydrogen peroxide solution. Rubber stoppers, also previously boiled in 10% hydrogen peroxide, were inserted in the neckpiece in each end of the column.

Each generator was then autoclaved at a temperature of 121° C. for 20 minutes to heat-activate the alumina.

Each activated column was loaded by passing a solution of fission product sodium molybdate, whose molybdenum content consisted almost entirely of molybdenum-99, through hollow inlet and outlet needles forced through the top and bottom stoppers of the generator column. For this purpose, the pH of the commercially available sodium molybdate-99 solution was adjusted with hydrochloric acid to 3.5±0.1 and diluted to a specific radioactivity of approximately 245 millicuries per ml. When loaded with 2 ml. of this solution (carrying approximately 470 millicuries/g. of aluminum), each generator had an activity of approximately 100 millicuries six days later. After addition of the loading solution, each column was allowed to stand for a period of 30 minutes.

To each column was then added approximately 1 ml. of an acetic acid solution having a pH of 4.0 which was introduced through the inlet needle and drawn off through the outlet needle. If more than about 2 ml. of acetic acid is added, it has been found that the yield of technetium-99m obtainable from the generator is adversely affected without any compensating benefits. The acetic acid wash was followed by the addition of 10 ml. of 0.9% sodium chloride solution. The residual solution was aspirated by passing 20 ml. of air through the column, the needles were capped and the generators were sterilized by autoclaving them once more at 121° C. for 20 minutes.

Generators prepared as described above gave high yields (substantially theoretical) of sodium pertechnetate when subsequently eluted with physiological saline solution. The molybdenum content of the eluate was only 0.001–0.005 $\mu$CiMo/mCiTc-99m. When, however, an alumina column was activated by conventional acid treatment, the eluate contained 0.01–0.05 $\mu$CiMo/mCiTc-99m, or roughly ten times as much. The pH of the eluates obtained ranged from 5.0 to 5.3 and the aluminum ion content was less than 0.3 g./ml.

It will be understood that generators of even greater activity can be prepared, i.e. by employing sodium molybdate solutions of greater specific activity. Likewise the acetic acid wash and aspiration of the residual wash solution may be omitted if the sodium pertechnetate is to be used for purposes where higher levels of aluminum ions in the eluate (e.g., 2 to 4 times greater) are not objectionable.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

What is claimed is:

1. A method for preparing a technetium-99m generator comprising the steps of:
    preparing a column containing chromatographic alumina which has been activated by heating it for a short time at a temperature of between about 100° C. and about 150° C.;
    treating the column with a solution having a pH of between 3 and 4 and containing molybdate ions whose molybdenum content consists essentially of molybdenum-99; and
    washing the treated column with a physiological saline solution to remove unwanted ions.

2. A method as set forth in claim 1 wherein the pH is approximately 3.5.

3. A method as set forth in claim 1 wherein said chromatographic alumina is heated at a temperature of approximately 120° C. for approximately 20 minutes.

4. A method as set forth in claim 1 wherein prior to said saline wash the treated column is washed with an acetate fixing solution.

5. A method as set forth in claim 4 wherein said fixing solution has a pH of between about 2.8 and about 6.0.

6. A method as set forth in claim 1 wherein air is passed through the column following the saline wash to remove residual solution.

7. A method as set forth in claim 1 wherein the radioactivity of the said molybdate solution is equivalent to approximately 400 millicuries per gram of alumina.

References Cited

UNITED STATES PATENTS

| 3,382,152 | 5/1968 | Lieberman et al. | 176—16 |
| 3,223,483 | 12/1965 | Osment | 423—628 |
| 3,628,914 | 12/1971 | Graulier | 423—628 |

FOREIGN PATENTS

| 2,030,102 | 6/1969 | Germany | 252—301.1 R |
| 1,265,769 | 3/1972 | Great Britain | 252—301.1 R |

OTHER REFERENCES

Allen, "Internat. Journal of Applied Radiation & Isotopes," vol. 16, No. 5, 1965, pp. 332–334.

CARL D. QUARFORTH, Primary Examiner

R. L. TATE, Assistant Examiner

U.S. Cl. X.R.

23—252; 176—16; 423—2; 424—1